United States Patent [19]

Komatsu

[11] Patent Number: 4,730,224

[45] Date of Patent: Mar. 8, 1988

[54] ROTARY COUPLER

[75] Inventor: Yasutoshi Komatsu, Kanagawa, Japan

[73] Assignee: Sony Corporation, Tokyo, Japan

[21] Appl. No.: 793,128

[22] Filed: Oct. 30, 1985

[30] Foreign Application Priority Data

Oct. 30, 1984 [JP] Japan ................................ 59-228259

[51] Int. Cl.[4] .............................................. G11B 15/14

[52] U.S. Cl. ....................................................... 360/64

[58] Field of Search .................... 360/64, 108; 333/261

[56] References Cited

U.S. PATENT DOCUMENTS 4,096,535 6/1978 Highnore ............................ 360/108

4,424,516 1/1984 Kruger et al. ...................... 333/261

4,516,097 5/1985 Munson et al. ..................... 333/261

4,609,960 9/1986 Fujioka .............................. 360/108

OTHER PUBLICATIONS

"Electromagnetic Waves & Radiating Ring Systems" by E. C. Jordan Prentice Hall E.E. Series ©1950, p. 241.

*Primary Examiner*—Vincent P. Canney

*Attorney, Agent, or Firm*—Hill, Van Santen, Steadman & Simpson

[57] ABSTRACT

A rotary coupler is disclosed, in which a rotor and a non-rotor are provided on their facing surfaces with microstrip lines which are disposed along circles concentric with the axis of the rotor and facing one another. High frequency signals are transferred between the microstrip line on the side of the rotor and the microstrip line on the side of the non-rotor.

2 Claims, 11 Drawing Figures

ROTARY COUPLER

BACKGROUND OF THE INVENTION

1. Field of the Invention

This invention relates to a rotary coupler for signal transfer between a rotor and a stator and, more particularly to a rotary coupler for a rotary magnetic head type video tape recorder or the like.

2. Description of the Prior Art

In a rotary magnetic head type video tape recorder, a rotary transformer is extensively utilized for the transfer of recording video signal and reproduced video signal to and from a rotary magnetic head provided in a rotor.

FIG. 1 shows a well-known rotary transformer. The rotary transformer illustrated includes a rotor 1 and a stator 2 which are made of ferrite. Primary and secondary coils 3 and 4 are provided in grooves formed in the outer and inner peripheries of the rotor 1 and stator 2, respectively. These coils 3 and 4 are magnetically coupled together for signal transfer.

In this rotary transformer, two pairs of primary and secondary coils 3 and 4 are provided for two channels. The rotor 1 and stator 2 are provided with respective metal rings 5 and 6 received in respective grooves. These metal rings 5 and 6 shield the two channels from each other. Leads 7 and 8 are led out from the coils 3 and 4 for connection to an external circuit.

In the rotary transformer which utilizes magnetic coupling between coils for the signal transfer, the bandwidth coverage is narrow because of the inductance of the coils and floating capacitance, and the upper frequency limit is 60 MHz at the most. Recently, with the development of digital VTRs, data recorders, high quality television sets, etc., there is a trend for increasing bandwidth coverage, and there is a demand for a rotary coupler having wide bandwidth transmission characteristics.

SUMMARY OF THE INVENTION

The present invention has been intended in the light of the above problems in the prior art rotary transformers, and its object is to provide a rotary coupler having a wide bandwidth transmission characteristics.

To attain the above object of the present invention, there is provided a rotary coupler, in which a rotor and a stator are provided on their facing surfaces with microstrip lines formed along circles, concentric with the axis of the rotor and facing one another for the transfer of high frequency signal between the rotor side microstrip line and the stator side microstrip line.

The above-mentioned and other objects and features of the invention will become apparent from the following detailed description taken in conjunction with the drawings which indicate embodiments of the invention.

DETAILED DESCRIPTION OF THE PREFERRED EMBODIMENTS

Figure 1:
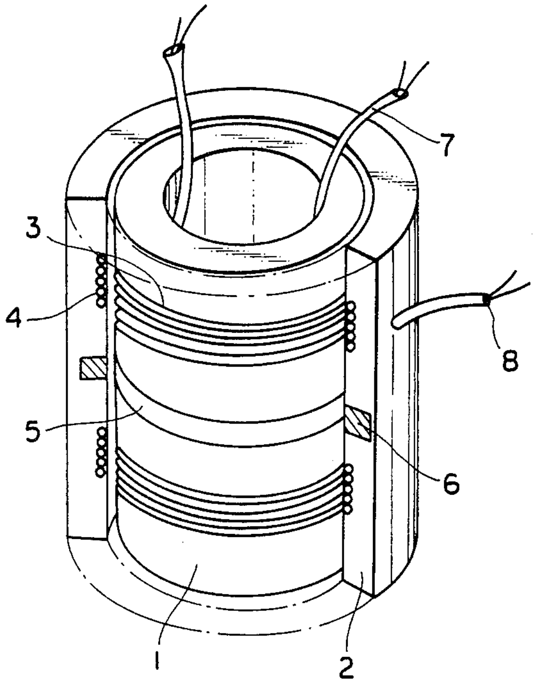
FIG. 1 is a perspective view, partly in section, showing the structure of a rotary transformer well known a prior art rotary coupler.
Figure 2:
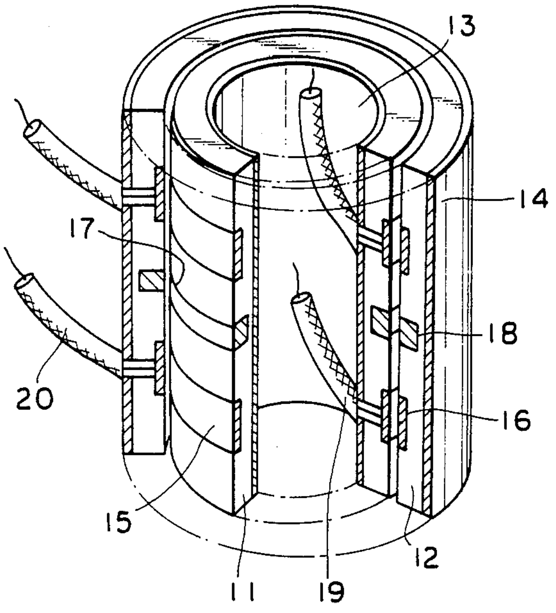
FIG. 2 is a perspective view, partly in section, showing an embodiment of the rotary coupler according to the present invention.

FIG. 2 shows an embodiment of the rotary coupler. This rotary coupler comprises a rotor 11 and a stator 12 which are made of a dielectric material. The inner periphery of the rotor 11 is entirely covered by a conductive layer 13. The outer periphery of the stator 12 is entirely covered by a conductive layer 14. The facing outer and inner peripheral surfaces of the rotor 11 and stator 12 are provided with microstrips 15 and 16 facing each other. The microstrips 15 and 16 and conductive layers 13 and 14 constitute microstrip lines. In this embodiment, two microstrip line pairs are provided for two signal transmission channels. The rotor 11 and stator 12 have respective metal rings 17 and 18 received in respective grooves for shielding the two channels from each other. Coaxial cables 19 and 20 are led out from the microstrips 15 and 16 for connection to an external circuit.

Figure 3:
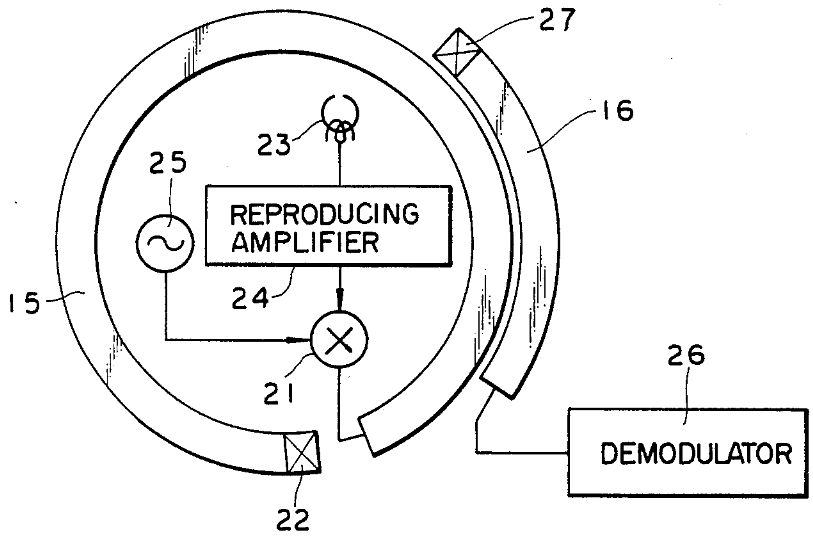
FIG. 3 is a schematic view showing the essential structure of the embodiment of the rotary coupler.

In this embodiment, the microstrip 15 provided on the rotor 11, as shown in FIG. 3, has one end connected to a modulator 21 and the other end terminated in a nonreflecting terminating resistor 22. Reproduced video signal is supplied from a rotary magnetic head 23 to the modulator 21 through a reproducing amplifier 24. A high frequency oscillator 25 supplies a high frequency signal at a frequency of about 10 GHz to the modulator 21 for modulation to obtain the reproduced video signal, which is supplied to one end of the microstrip 15. A demodulator 26 is connected to one end of the microstrip 16 which is provided on the stator 12. The other end of the microstrip 16 is terminated in a non-reflecting terminating resistor 27. The length L, over which the microstrips 15 and 16 face each other, i.e., in this embodiment the length of the microstrip 16 provided on the stator 12, is set to an odd number multiple of a quarter of the wavelength $\lambda$ of the high frequency signal, i.e., $(2n+1)\cdot\lambda/4$. The microstrip 16 on the side of the stator 12 and microstrip 15 on the side of the rotor 11 are electromagnetically coupled together and constitute a directional coupler.

In the embodiment of the above construction, the modulated output signal obtained through modulation of the high frequency signal with the reproduced video signal, is supplied from the modulator 21 to one end of the microstrip 15 provided on the rotor 11. The modulated output signal is transmitted in one direction toward the end of the microstrip 15, whereby it is transmitted to the microstrip 15 on the side of the stator 12 facing the microstrip 15 to be demodulated by the demodulator 26. The directional coupler constituted by the microstrip lines has a signal transmission characteristic with a specific bandwidth of 10% or above. Therefore, with this embodiment where a high frequency signal at a frequency of about 10 GHz is modulated according to the reproduced video signal for transfer, it is possible to realize a signal transmission characteristic having a very wide bandwidth of the order of several 100 MHz. In this embodiment, the microstrips 15 and 16 on the rotor 11 and stator 12, respectively, have their other ends terminated in the non-reflecting terminating resistors 22 and 27. Therefore, it is possible to freely set the length of the microstrip 15 and 16.

Figure 4:
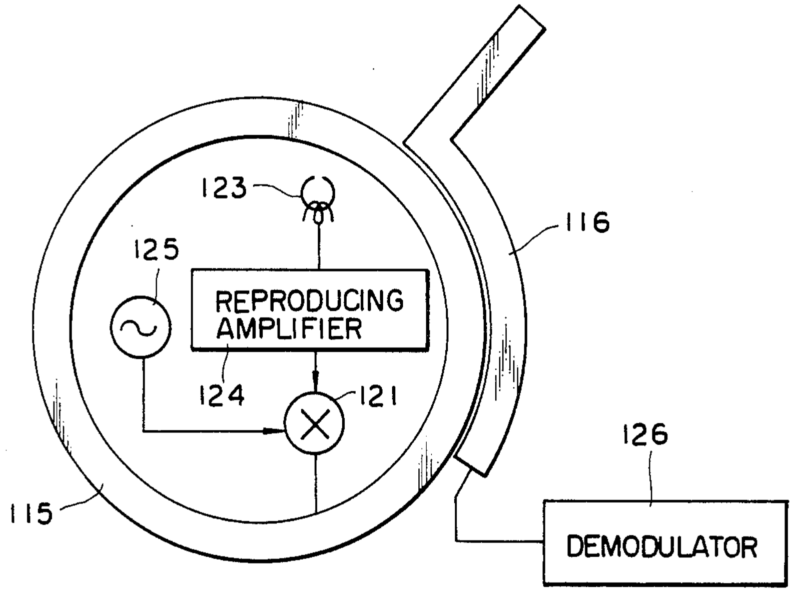
FIG. 4 is a schematic view showing the essential structure of a different embodiment of the rotary coupler according to the present invention.

FIG. 4 shematically shows a different embodiment of the rotary coupler according to the present invention. In this embodiment, a microstrip 115 on the rotor side is in the form of a closed loop so that it constitutes a resonator by itself. A modulator 121 is connected to the microstrip 115. Reproduced video signal is supplied from a rotary magnetic head 123 to the modulator 121 through a reproducing amplifier 124. Also, a high frequency signal at a frequency of about 10 GHz, for instance, is supplied from a high frequency oscillator 125 to the modulator 121. The modulator 121 modulates the high frequency signal according to the reproduced video signal and supplies the modulated output signal to the microstrip 115. The rotor side microstrip 115 is in the form of a closed loop having a circumferential length $L_o$ equal to an integral number n times the wavelength λ of the high frequency signal, i.e., n·λ, and it constitutes by itself a resonator resonating with the high frequency signal. The stator side microstrip 116 is in the form of an opened loop with a length $L_1$ equal to the integral number n times one half the wavelength λ of the high frequency signal, i.e., n·λ/2, and constitutes by itself a resonator resonating with the high frequency signal. A demodulator 126 is connected to an end of the microstrip 116. The microstrip 116 on the side of the stator and the demodulator 126 are not so strongly coupled together. The stator side microstrip 116 is electromagnetically coupled to the rotor side microstrip 115 for a portion thereof with a length $L_2$ equal to an odd number multiple of a quarter of the wavelength λ of the high frequency signal, i.e., (2n+1)·λ/4.

In this embodiment, the modulated output signal obtained through modulation of the high frequency signal according to the reproduced video signal is supplied from the modulator 121 to the microstrip 115 on the side of the rotor. The modulated output signal is transferred to the microstrip 116 through the electromagnetic coupling between the microstrips 115 and 116 on the respective rotor and stator sides. The transferred signal is demodulated by the demodulator 126 connected to one end of the microstrip 116.

In this embodiment, the rotor side microstrip 115 is in the form of a closed loop having a circumferential length Lo equal to an integral number n times the wavelength λ of the high frequency signal, i.e., n·λ, while the stator side microstrip 116 is in the form of an opened loop with a length $L_1$ equal to the integral number n times one half the wavelength λ of the high frequency signal, i.e., n·λ/2. These microstrip lines function as individual resonators, so that it is possible to realize high efficiency signal transfer.

Figure 5:
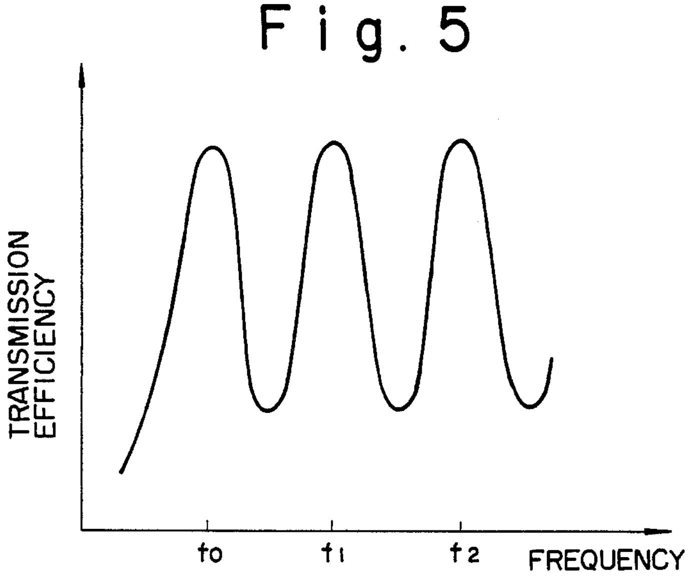
FIG. 5 is a graph showing a signal transmission characteristic of the embodiment of the rotary coupler.

In this embodiment, since each of the microstrip line functions as a resonator, a wavelength selectively as shown in FIG. 5 is obtained with respect to the fundamental resonant frequency $f_0$ and harmonics $f_1$, $f_2$, . . . thereof, each of these frequencies constituting a pass band. The bandwidth of the pass band of each of the above frequencies depends on the Q of the microstrip line resonator. The Q noted above is not the no-load Q but the under-load Q of the resonator. Therefore, the bandwidth of the pass band can be controlled through control of the coupling between the stator side microstrip 116 and demodulator 126.

Figure 6:
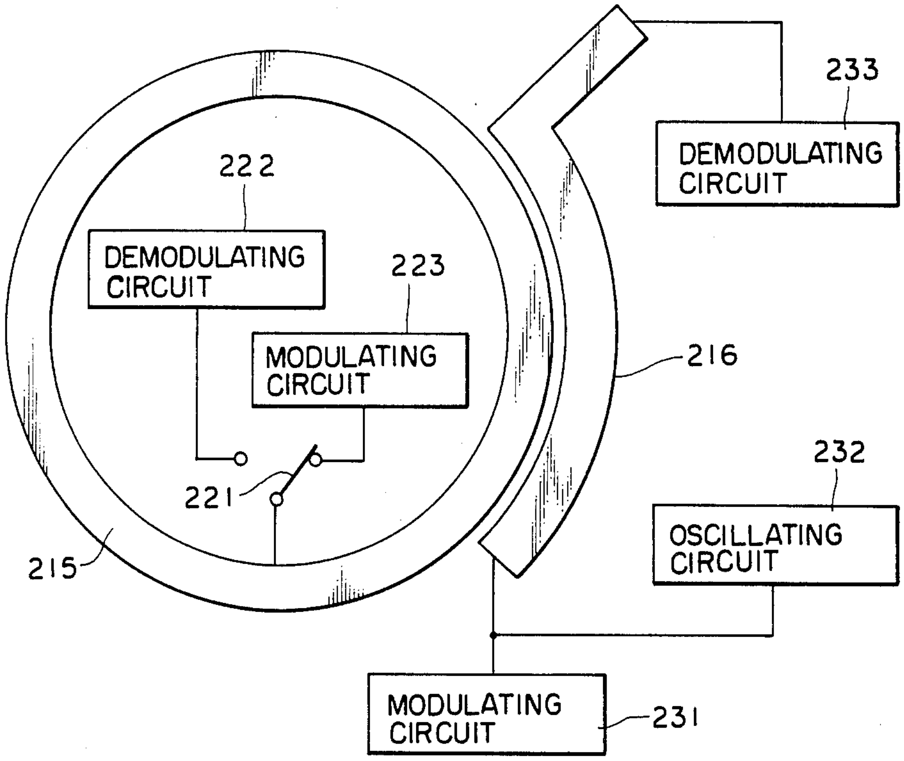
FIG. 6 is a schematic view showing the essential structure of a further embodiment of the rotary coupler according to the present invention.

FIG. 6 schematically shows a further embodiment of the rotary coupler according to the present invention. A microstrip 215 of the rotor side is in the form of a closed loop so that it functions as a resonator by itself. A demodulating circuit 222 and a modulating circuit 223 can be selectively connected to the microstrip 215 through a switch 221. A microstrip 216 on the stator side is in the form of an opened loop. It faces and is electromagnetically coupled to the microstrip 215 on the rotor side. A modulating circuit 231 and an oscillating circuit 232 are connected to one end of the microstrip 216 on the stator side, and a demodulating circuit 233 is connected to the other end of the microstrip 216. The oscillating circuit 232 can oscillate at the resonant frequency of the closed loop microstrip 215 on the rotor side, e.g., 10 GHz.

Again in this embodiment, the rotor side microstrip 215 is in the form of a closed loop having a circumferential length $L_0$ equal to an integral number n times the wavelength λ of the high frequency signal generated from the oscillating circuit 232, i.e., n·λ. It constitutes a resonant circuit resonating with the high frequency signal. The stator side microstrip 216 is in the form of an opened loop with a length equal to the integral number n times one half the wavelenth λ of the high frequency signal, i.e., n·λ/2, and it constitutes a resonant circuit resonating with the high frequency signal. The stator side microstrip 216 faces the rotor side microstrip 215 only for a length $L_2$ equal to an odd number multiple of a quarter of the wavelength λ of the high frequency signal, i.e., (2n+1)·λ/4, and this facing portion is electromagnetically coupled to the stator side microstrip 216.

In the embodiment of the above construction, with a change in the impedance of the modulating circuit 223 connected through the switch 221 according to the reproduced video signal obtained by a rotary magnetic head (not shown), the resonant frequency of the closed loop microstrip 215 on the rotor side is changed according to the change in the impedance noted above. The oscillating frequency of the impedance noted above. The oscillating frequency of the oscillating circuit 232, which is connected to the stator side microstrip 216 electromagnetically coupled to the closed loop microstrip 215 on the rotor side, is changed according to a change in the resonant frequency of the closed loop microstrip 215 on the rotor side. The change in the oscillation frequency of the oscillating circuit 232, i.e., the reproduced video signal, is detectd by the demodulating circuit 233 connected to the microstrip 216 on the stator side, and the reproduced video signal is demodulated. More specifically, the reproduced video signal reproduced from the magnetic tape by the rotary magnetic head (not shown) is transferred from the rotor to the stator through the electromagnetic coupling of the individual microstrip lines.

Further, in this embodiment for signal transfer from the stator side to the rotor side, the impedance of the modulating circuit 231 connected to the microstrip 216 on the stator side is changed according to the recording video signal, whereby the resonant frequency of the closed loop microstrip 215 on the rotor side is changed through the electromagnetic coupling of the microstrip lines 215 and 216. The oscillation frequency of the oscillating circuit 232, which is connected to the stator side microstrip 216 electromagnetically coupled to the rotor side closed loop microstrip 215, is changed according to a change in the resonant frequency of the rotor side closed loop microstrip 215. A change in the oscillation frequency of the oscillating circuit 232 is detected by the demodulating circuit 222, which is selectively connected to the rotor side closed loop microstrip 215 through the switch 221, whereby the recording video signal is demodulated. That is, the recording video signal is transferred from the stator side to the rotor side to be recorded on a magnetic tape by the rotary magnetic head (not shown).

It is to be understood that with this embodiment the oscillation frequency of the oscillating circuit 232 used for the signal transfer is changed according to the resonant frequency of the microstrip lines. Thus, it is possible to effect signal transfer without bandwidth limitation imposed by the Q of the microstrip lines. Besides, bilateral signal transfer between the stator and rotor is possible without provision of the oscillating circuit on the rotor side. The circuit construction thus can be extremely simplified.

Figure 7:
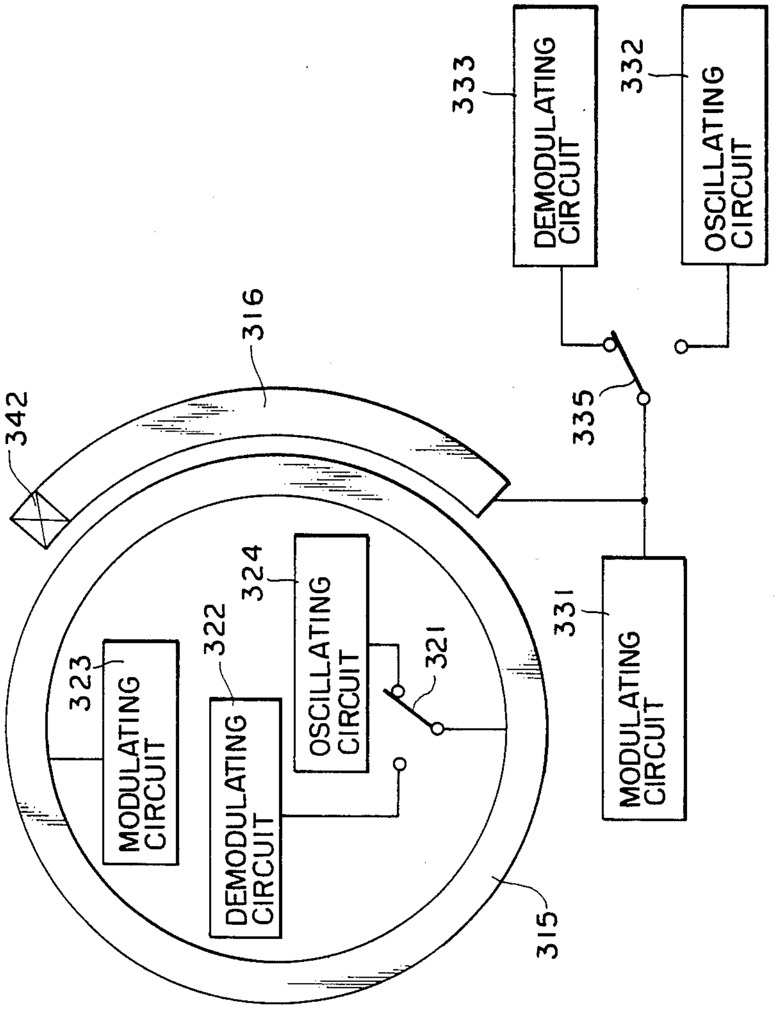
FIG. 7 is a schematic view showing the essential structure of a further embodiment of the rotary coupler according to the present invention.

In each of the above embodiments the length $L_1$ of the stator side microstrip is set to an integral number n times one half the wavelength λ of the high frequency signal generated from the oscillating circuit, i.e., $n \cdot \lambda/2$, so that the microstrip serves as a resonant circuit resonating with the high frequency signal. FIG. 7 shows a further embodiment, in which one end of a stator side microstrip 316 is terminated in a non-reflecting terminating resistor 342. Thus, the length noted above can be set to a desired length. In this embodiment, a modulating circuit 331 is connected to the other end of the stator side microstrip 316, and it is also connected to an oscillating circuit 332 and a demodulating circuit 333 through a switch 335. Further, a modulating circuit 323 is connected to the stator side microstrip 315 and is also connected to a demodulating circuit 322 and an oscillating circuit 324 through a switch 321.

Figure 8:
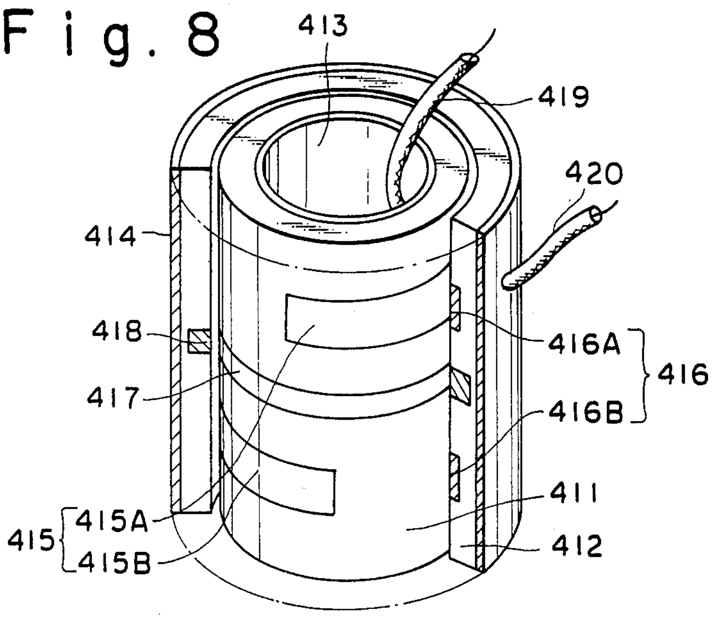
FIG. 8 is a perspective view, partly in section, showing a further embodiment of the rotary coupler according to the present invention.
Figure 9:
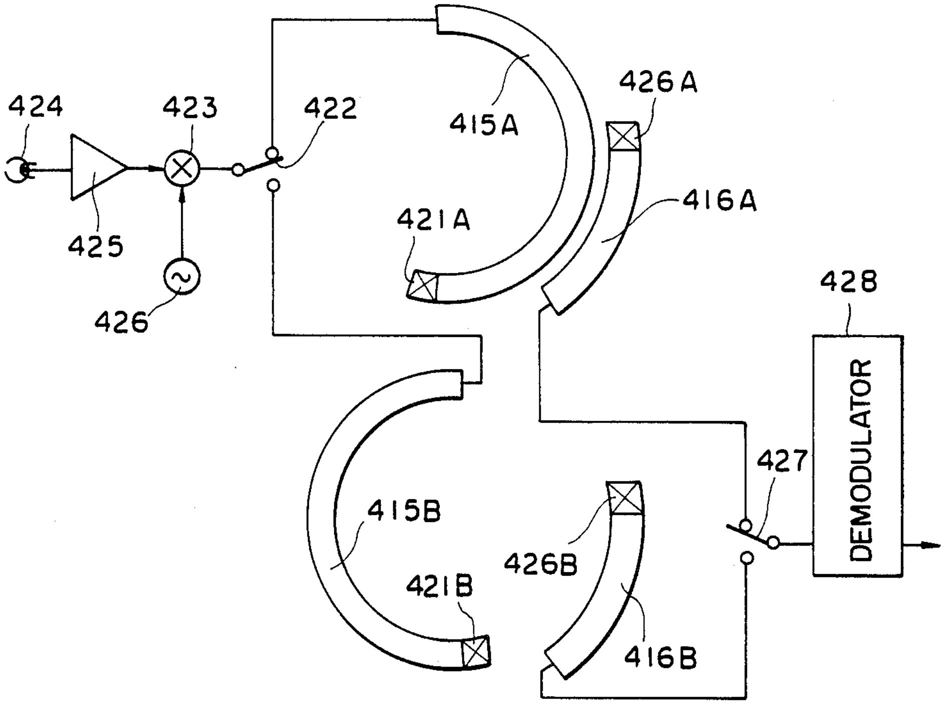
FIG. 9 is a schematic view showing the essential structure of the embodiment.

FIGS. 8 and 9 show a further embodiment of the present invention.

The rotary coupler shown in FIG. 8 comprises a rotor 411 and a stator 412 which are made of a dielectric material. The inner periphery of the rotor 411 is entirely covered by a conductive layer 413. The outer periphery of the stator 412 is entirely covered by a conducture layer 414. Two pairs of microstrips 415 and 416 are provided on the inner and outer peripheries of the rotor 411 and stator 412 such that the microstrips 415 and 416 of each pair face each other. The microstrips 415 and 416 and conductive layers 413 and 414 constitute microstrip lines. In this embodiment, metal rings 417 and 418 are received in grooves formed in the rotor 411 and stator 412 to shield the upper microstrip line 415A. 416A and lower microstrip line 415B, 416B from each other. Coaxial cables 419 and 420 are led out from the microstrips 415 and 416 for connection to an external circuit.

In this embodiment, the microstrips 415A and 415B on the side of the rotor 411 are disposed 180° out of phase with each other on the outer periphery of the rotor 411, as shown in FIG. 9. They partly overlap each other and cover the entire outer periphery of the rotor 411. They are terminated at one end in respective non-reflecting terminating resistors 421A and 421B. Their other ends are connected to a modulator 423 through a switch 422. Reproduced video signal is supplied from a rotary magnetic head 424 through a reproducing amplifier 425 to the modulator 423. A high frequency signal at a frequency of about 10 GHz is supplied from a high frequency oscillator 426 to the modulator 423. The modulator 423 modulates the high frequency signal according to the reproduced video signal. The modulated output signal is selectively supplied to the microstrips 415A and 415B through the switch 422. The microstrips 416A and 416B on the side of the stator 412 are terminated at one end in respective non-reflecting terminating resistors 426A and 426B. Their other ends are connected to a demodulator 428 through a switch 427. The switches 422 and 427 are controlled for switching in synchronism to the rotation of the rotor 411. The length L, over which the microstrips 415 and 416 face each other, i.e., in this embodiment the length of the microstrips 416A and 416B on the side of the stator 412, is set to an odd number multiple of a quarter of the wavelength λ of the high frequency signal, i.e., $(2n+1) \cdot \lambda/4$. The microstrip 416 on the side of the stator 412 and microstrip 415 on the side of the rotor 411 are electromagnetically coupled together and constitute a directional coupler.

In this embodiment of the above construction, the modulated output signal obtained through modulation of the high frequency signal according to the reproduced video signal is supplied from the modulator 423 to the microstrip 415A and 415B on the side of the rotor 411 alternately through the switch 422. The modulated output signal is transmitted in one direction toward the end of the microstrips 415A and 415B to be transferred to the microstrips 416A and 416B on the side of the stator 412 facing the microstrips 415A and 415B. The transferred signal is demodulated by the demodulator 428, which is connected to the microstrips 416A and 416B through the switch 427. As has been shown, in this embodiment the microstrips 415A and 415B on the side of the rotor 411 divide two stages to partly overlap and cover the entire circumference of the outer periphery of the rotor 411. Thus, the signal can be continuously transferred to the microstrips 416A and 416B on the side of the stator 412 facing the microstrips 415A and 415B on the side of the rotor 411.

Figure 10:
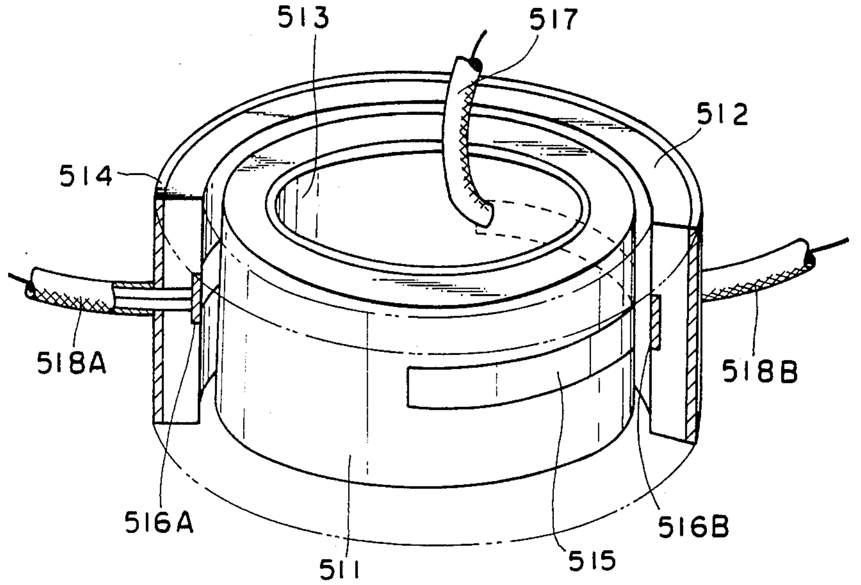
FIG. 10 is a perspective view, partly in section, showing a further embodiment of the rotary coupler according to the present invention.
Figure 11:
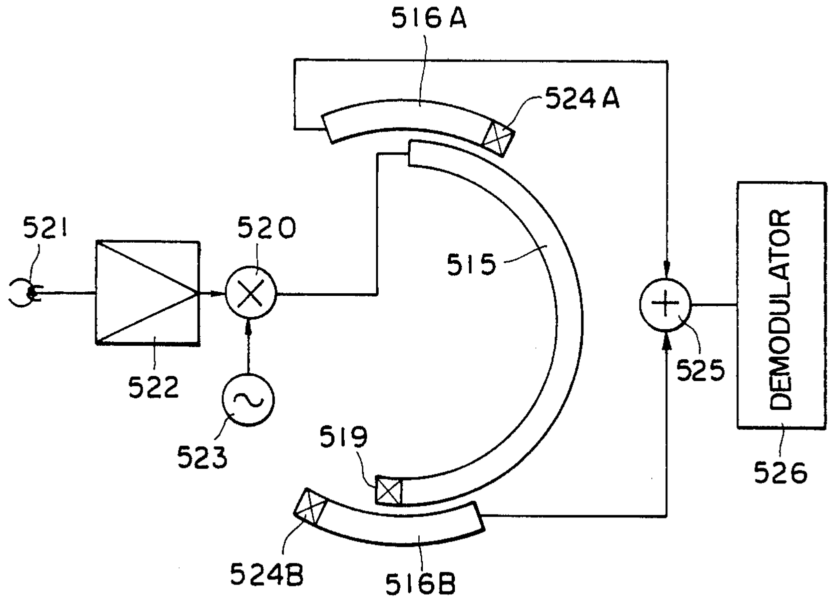
FIG. 11 is a schematic view showing the essential structure of the embodiment.

FIGS. 10 and 11 show a further embodiment of the present invention. The rotary coupler shown in FIG. 10 comprises a rotor 511 and a stator 512 which are made of a dielectric material. The inner periphery of the rotor 511 is entirely covered by a conductive layer 513. The outer periphery of the stator is entirely covered by a conductive layer 514. Microstrips 515, 516A and 516B are provided on the outer and inner peripheries of the rotor 511 and the stator 512, respectively. The microstrips 515, 516A and 516B and conductive layers 513 and 514 constitute microstrip lines. Coaxial cables 517, 518A and 518B are led out from the microstrips 515, 516A and 516B for connection to an external circuit.

In this embodiment, the microstrip 515 on the side of the rotor 511 has a length $n \cdot \lambda$ equal to an integral multiple of the wavelength λ of the high frequency signal to be transferred. It is provided to cover one half of the circumference of the outer periphery of the rotor 511. As schematically shown in FIG. 11, the microstrip 515 is terminated at one end in a non-reflecting terminating resistor 519 and is connected to the other end to a modulator 520. Reproduced video signal is supplied from a rotary magnetic head 521 to the modulator 520 through a reproducing amplifier 522. A high frequency signal at a frequency of about 10 GHz is supplied from a high frequency oscillator 523 to the modulation 520. The modulator 520 modulates the high frequency signal according to the reproduced video signal. The modulated output signal is supplied to the microstrip 515.

As schematically shown in FIG. 11, the microstrips 516A and 516B formed on the side of the stator 512 are symmetrical with respect to the axis of the rotor 511, that is, they are 180° out of phase with each other. The microstrips 516A and 516B are terminated at one end in non-reflecting terminating resistors 524A and 524B. Their other ends are connected to a demodulator 526 through a signal synthesizer 525.

In this embodiment of the above construction, the modulated output signal obtained through modulation of the high frequency signal according to the reproduced video signal is supplied from the modulator 520 to the microstrip 515 on the side of the rotor 511. The modulated output signal is transmitted in one direction toward the end of the microstrip 515 to be transferred to the microstrips 516A and 516B on the side of the stator 512 facing the microstrip 515. The signal transferred to the microstrips 516A and 516B is synthesized by the signal synthesizer 525. The synthesized output is supplied to the demodulator 526 for demodulation.

In this embodiment, the microstrip 515 is provided on the rotor 511 to cover one half of the circumference of the periphery, and the microstrips 516A and 516B are provided symmetrically on the stator 512. Therefore, when one of the two microstrips 516A and 516B on the side of the stator 512, i.e., microstrip 516A, is coupled over the entirely surface to the microstrip 515 on the side of the rotor 511, the other microstrip 516B is not coupled at all. The microstrip 516B turns to be coupled to the microstrip 515 on the side of the rotor 511 as the other microstrip 516A reaches the end of the microstrip 515 and gradually released from the coupling thereto. The coupling is thus a complenmentary coupling. The signal synthesizer 525 has a function of stabilizing the signal level by adding together the transmitted signal through the complementary coupling between the microstrips 516A and 516B on the side of the stator 512 and the microstrip 515 on the side of the rotor 511. Since the length of the microstrip 515 on the side of the rotor 511 is set to an integral multiple of the wavelength of the signal to be transferred, the signals transferred to the microstrips 516A and 516B on the side of the stator 512 are in phase. These signals thus can be directly added together in the signal synthesizer 525. If there is a signal reflection or the like while the signals transferred to the microstrips 516A and 516B on the side of the stator 512 are added together by the signal synthesizer 525, interference is produced between the microstrips 516A and 516B. Distortion of the transmission characteristics, therefore, is liable to result. To prevent this, an isolator or an amplifier having satisfactory isolation property may be provided between each of the microstrips 516A and 516B and signal synthesizer 525.

As has been shown, in this embodiment the microstrips 516A and 516B on the side of the stator 512 facing the microstrip 515 on the side of the rotor 511 are provided symmetrically. Thus, the signal can be continuously transferred from the rotor 511 to the stator 512.

The present invention in not limited only the above embodiments. The rotor and the stator are determined relative to each other, so that the microstrip lines on the side of the rotor may be provided in a symmetrically distributed state. Further, the number of the microstrip lines provided in a distributed state may not be two, but it may be three at 120° intervals.

In the above embodiments, it is possible to transfer multi-channel signal by utilizing a multiplex modulation system such as frequency division multiplex modulation, time division multiplex modulation, multiphase PSK (phase shift keying) modulation or multiplex QAM (quadrature amplitude modulation).

The state of coupling between the microstrip lines may be made variable by varying the gap of the stator with respect to the outer periphery of the rotor. To this end, it may be arranged to permit transfer of high frequency signal between the rotor and stator through the coupling between microstrip lines formed on the outer periphery of a cylindrical rotor and microstrip lines formed on a planar stator.

What is claimed is:

1. A rotary coupler for transferring signals between signal processing circuits provided on a rotor and a stator, comprising:

first and second microstrip lines formed on facing surfaces of said rotor and stator and facing each other, said first and second microstrip lines respectively having signal input/output terminals, at least one of said first and second microstrip lines being substantially in the form of a ring-shaped microstrip line, an oscillator circuit for generating a high frequency signal at a resonant frequency of a resonant circuit formed of such first and second microstrip lines, and a variable impedance circuit connected to said oscillator circuit for varying said resonant frequency in response to said signal, said high frequency signal being modulated by said variable impedance circuit and transferred between the rotor side microstrip line and the stator side microstrip line.

2. A rotary coupler for transferring signals between signal processing circuits provided on a rotor and a stator, comprising:

first and second microstrip lines formed on facing surfaces of said rotor and stator and facing each other, said first and second microstrip lines respectively having signal input/output terminals, at least one of said first and second microstrip lines being substantially in the form of a ring-shape microstrip line, and a third microstrip line cooperating with said first microstrip line, whereby said second microstrip line is always electrically coupled to either said first microstrip line or to said third microstrip line so that said signals continuously transfer between said rotor and said stator.

* * * * *